Patented Oct. 17, 1944

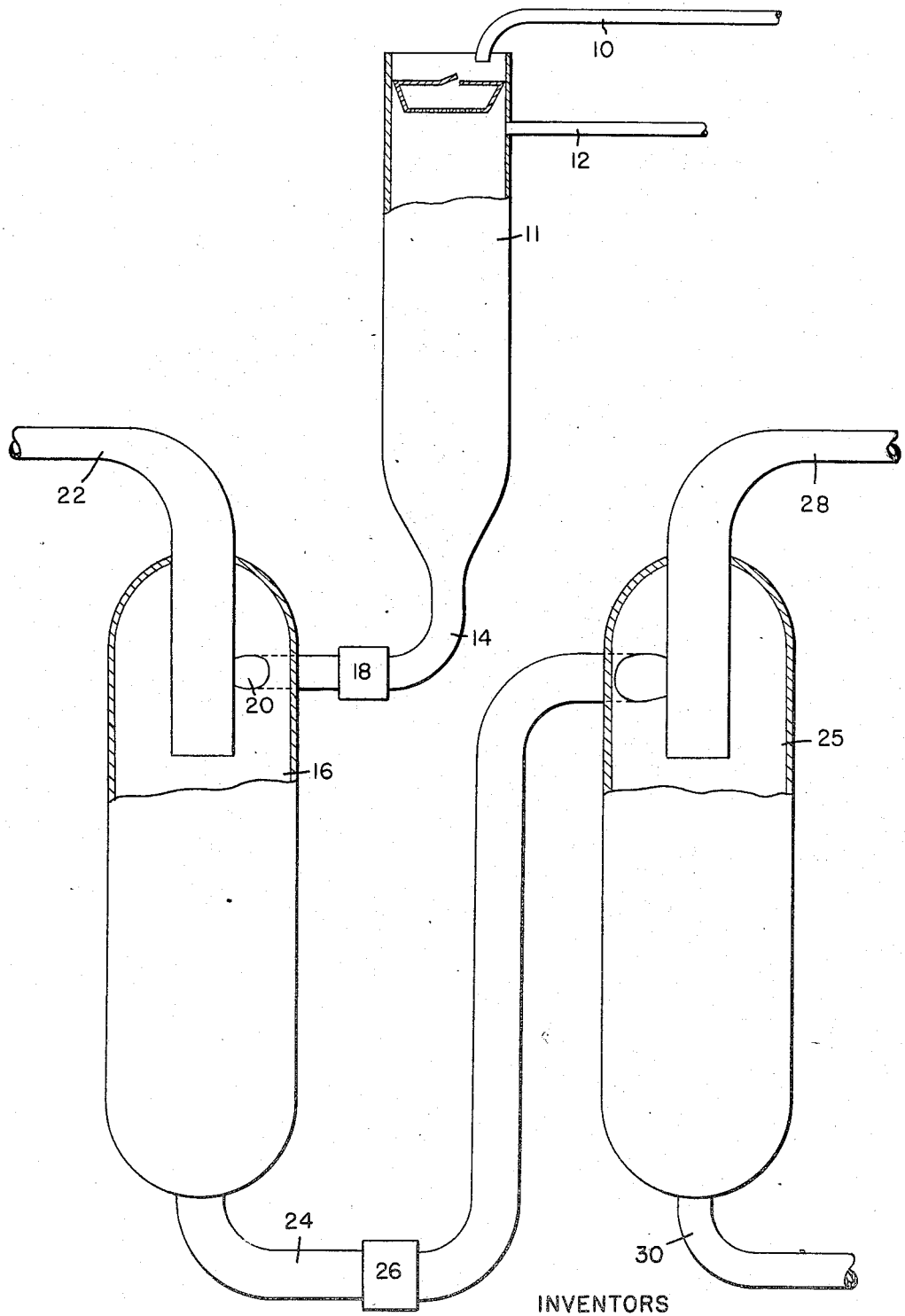

2,360,556

UNITED STATES PATENT OFFICE 2,360,556

METHOD OF MAKING BLUE-VEINED CHEESE

Nels E. Fabricius and Verner H. Nielsen, Ames, Iowa, assignors to Iowa State College Research Foundation, Ames, Iowa, a corporation of Iowa Application March 31, 1941, Serial No. 386,034

1 Claim. (Cl. 99—116)

In the art of cheese making it has heretofore not been practical to use pasteurized milk for the manufacture of blue mold types of cheese. Pasteurization by known processes, when carried to a sufficient extent to insure freedom from contamination, apparently destroys the lipases or fat-hydrolyzing enzymes which are essential in the ripening of blue mold cheese.

We have developed a cheese-making process, however, by which it is possible to destroy the undesirable bacteria and micro-organisms, and thus achieve the principal object of pasteurization, and still obtain a cheese which will ripen properly.

In the accompanying drawing, the single figure is a diagrammatic representation of one particular type of equipment with which a part of our process may be carried out. The diagram is included, however, merely so that there may be a full and complete teaching of a manner of practicing our invention, and we do not mean to limit ourselves to the performance of the process with this particular apparatus.

The process to be described is one which may be used in the manufacture of blue mold types of cheese from cow's milk, goat's milk or sheep's milk. By blue mold tyes of cheese we include those commonly known as Roquefort, Stilton, Gorgonzola, and Blue cheese.

The milk to be used for cheese making in our process need not be separated, but is preferably introduced in the whole state through a pipe 10 into a chamber 11 where a temperature of approximately 165°–170° F. and a sub-atmospheric pressure representing a vacuum of approximately 19 inches of mercury are maintained. The milk is preferably sprayed into the top of this chamber so that it will be broken up as finely as possible. Steam is admitted through an inlet 12, the milk being heated almost instantaneously by the steam, in what may be described as flash pasteurization under vacuum. In this step the bacteria are destroyed to much the same extent as in conventional pasteurizing processes, but without accompanying destruction of the lipases.

When the heated milk reaches the bottom of the chamber 11 it is carried off by a conduit 14, which leads into a second chamber 16. In the chamber 16 a vacuum of 24 inches is maintained, a regulating valve 18 being provided in the conduit 14 to control and maintain the difference of pressure between the chambers 11 and 16. The inlet 20 to the chamber 16 is arranged so that the milk coming into the chamber is directed tangentially along the wall, being thus spread out thin, and traversing a long path in reaching the bottom of the chamber. During this traverse, much of the gases or volatile substances which give unpleasant taste or odor to the milk will be given off, because of the high temperature and reduced pressure. These substances are drawn off through a connection 22 at the top of the chamber 16, leading to any desired type of ejector or condenser. A considerable part of the water vapor carried over by the milk will also be carried off through the connection 22. To the extent that water is actually evaporated from the milk, there is a cooling effect.

From the bottom of the chamber 16 the milk may be passed through a conduit 24 into a third chamber 25 much like the chamber 16. A pressure of approximately 28 inches of vacuum is maintained in the third chamber, and regulating means 26 may be interposed in the line 24 to maintain the difference of pressure between chambers 16 and 25. The conduit 24 leads tangentially into the chamber 25, like the inlet 20 previously described, and suitable ejector or condenser means 28 are connected to the top of the chamber. Under the high vacuum substantially all the water is removed from the milk, which is further cooled by the evaporation, and is finally discharged through the outlet passage 30.

For the practice of the part of our process just described, the particular apparatus referred to is not essential. The fundamental steps are the flash "pasteurization" by intimate contact of the milk with steam at a temperature of approximately 165°–170° F. and a vacuum of approximately 19 inches of mercury, followed by prompt cooling of the milk and extraction of the excess water or water vapor from it. Extraction under vacuum in the manner described has the advantage that undesirable volatiles, etc., are also drawn off, which contributes to uniformity of flavor in the finished cheese, but is not believed essential to the principal object and achievement of our invention, i. e., the destruction of undesirable bacteria to an extent equivalent to commercial pasteurizing methods, with preservation of the fat-hydrolyzing enzymes.

After the milk has been treated as above described, its temperature is adjusted to about 88°–90° F. and two to three per cent of a culture of S. lactis is added in order to develop sufficient acidity before curdling. The amount of culture used in this process exceeds by one-half to one per cent the amount used in ordinary procedures. Apparently some of the organisms are destroyed in the heating process and this extra amount of culture is necessary in order to replace them with a pure culture of lactic acid producing organisms.

When an acidity of .18–.20 per cent of acid (determined as lactic acid), has been developed by ripening, rennet extract is added in the proportion of 100 cc. per 1000 lbs. of milk and the milk is allowed to curdle during 60–90 minutes. When a firm curd has formed, it is cut in one-half inch cubes by means of curd wires. The whey is separated from the curd by slight stirring, and finally by draining, the temperature being carefully maintained at 88°–90° F. throughout.

A pure culture of *Penicillium roquefortii* or other mold culture is mixed with the curd, which is shaped into units of cheese in cylindrical metal hoops. After further drainage the cheeses are salted and finally skewered with a needle so that oxygen may penetrate the cheese to permit the growth of mold.

When the cheese has been cured from four to six weeks it is possible to detect a rapid advance in the processes which constitute the ripening of blue mold cheese, namely the presence of considerable amounts of free fatty acids and methyl ketones. At the end of twelve weeks the cheese made by the above method has already the characteristic "peppery" flavor of blue mold cheese and an additional sweet, pleasant aroma which it has not been possible to produce by other known methods.

The process described has a number of important advantages. Heat treatment of the milk under vacuum at modified temperatures destroys undesirable organisms, removes offensive volatile odors from the milk, and results in a cheese with a milder, more pleasant flavor than blue mold cheese made by other methods. The heat treatment appears to improve the keeping quality of the resultant cheese and makes it possible to produce more uniform cheese from day to day. The removal of offensive odors also contributes to uniformity of the cheese.

Furthermore, our experience indicates that the lipases or fat-hydrolyzing enzymes are not only not destroyed, but the heat treatment actually accelerates the fat hydrolysis to such an extent that the cheese may be fully cured within three months, whereas blue mold cheese made from raw, untreated milk requires from five to six months to develop a characteristic flavor.

Cheese produced as described has a whiter, more desirable color than if made with raw, untreated milk. It has a softer, smoother body than cheese made from raw milk, but still retains a body which permits handling and shipping under commercial conditions.

The attainment of uniformity in product is much to be desired in the cheese industry, and our invention overcomes many of the shortcomings of previous methods of manufacture in this respect. Reduction of the curing time is also of great commercial importance, because it permits a substantial reduction in the amount of space required for proper storage of a given output of cheese during the time it is being cured for market.

In the claim, where the term "milk" alone is used, we intend to include broadly any of the lacteal fluids, or separated components thereof, such as cream.

Some changes may be made in the details of procedure involved in the practice of our method without departing from the real spirit and purpose of our invention, and it is our intention to cover by our claim any variant modes of procedure which may be reasonably included within its scope.

We claim as our invention:

The process of making blue-veined cheese, which includes the steps of subjecting finely divided whole milk to the sudden action of steam in a chamber at a temperature of approximately 165° to 175° F. and under vacuum, and drawing off vapors and gases, and cooling the milk promptly to avoid destruction of the milk lipases and making the milk so treated into blue cheese.

NELS E. FABRICIUS.
VERNER H. NIELSEN.